United States Patent
Hou

(10) Patent No.: US 7,866,046 B2
(45) Date of Patent: Jan. 11, 2011

(54) METHOD FOR MANUFACTURING HYDRODYNAMIC BEARING AND SHAFT

(75) Inventor: Chuen-Shu Hou, Taipei Hsien (TW)

(73) Assignee: Foxconn Technology Co., Ltd., Tucheng, Taipei County (TW)

( * ) Notice: Subject to any disclaimer, the term of this patent is extended or adjusted under 35 U.S.C. 154(b) by 1021 days.

(21) Appl. No.: 11/627,566

(22) Filed: Jan. 26, 2007

(65) Prior Publication Data

US 2008/0134510 A1    Jun. 12, 2008

(30) Foreign Application Priority Data

Dec. 8, 2006   (CN) .................. 2006 1 0157365

(51) Int. Cl.
*B21D 53/10*  (2006.01)
(52) U.S. Cl. ............... 29/898.02; 29/898.041; 29/898.07; 29/898.09; 425/577
(58) Field of Classification Search ............. 29/898.02, 29/898.041, 898.07, 898.09; 425/577
See application file for complete search history.

(56) References Cited

U.S. PATENT DOCUMENTS 7,146,733 B2 * 12/2006 Yamashita et al. ....... 29/898.02

2006/0002640 A1   1/2006  Chen Lee-Long et al.
2006/0051003 A1   3/2006  Nii et al.

FOREIGN PATENT DOCUMENTS

JP     10306827         11/1998
WO    2006123602 A1    11/2006

* cited by examiner

*Primary Examiner*—Rick K Chang
(74) *Attorney, Agent, or Firm*—Jeffrey T. Knapp

(57) ABSTRACT

A method for manufacturing a hydrodynamic bearing (30) includes the following steps. First, a substrate having a surface with multiple protrusions thereon is formed. The protrusions are adapted for forming grooves in a preform. The preform, when finally processed, becomes a shaft of the hydrodynamic bearing or a bearing of the hydrodynamic bearing. Second, a feedstock of binder and powder is pushed to the surface of the substrate to form the perform on the surface of the substrate. Third, the substrate is removed from the preform. Fourth, the preform is sintered. Fifth, the preform is precision machined to obtain the shaft or the bearing, as the case may be. In the shaft or bearing, the grooves are for generating hydrodynamic pressure.

12 Claims, 5 Drawing Sheets

METHOD FOR MANUFACTURING HYDRODYNAMIC BEARING AND SHAFT

BACKGROUND OF THE INVENTION

1. Field of the Invention

The present invention relates generally to a method of forming a bearing or a shaft, and more particularly to a method of manufacturing a bearing or a shaft with hydrodynamic pressure generating grooves.

2. Description of Related Art

At present, a plurality of so-called hydrodynamic bearings have been widely used in spindle motors of electronic driving devices, such as compact disc read-only memory (CD-ROM), digital video disc (DVD), hard disks, laser beam printers, floppy disks or other heat-dissipation fans. In the electronic driving devices, it is desired to provide a hydrodynamic bearing with small size, high rotational accuracy and long life.

A typical hydrodynamic bearing comprises a bearing surface defining a bearing hole and a shaft rotatably received in the bearing hole with a bearing clearance formed between an inner circumferential surface of the bearing and an external circumferential surface of the shaft. A plurality of hydrodynamic pressure generating grooves are defined either in the inner circumferential surface of the bearing or in the external circumferential surface of the shaft. The grooves can accommodate lubricant, such as oil. During rotation of the shaft, the lubricant is driven with the rotating shaft due to the viscosity of the lubricant. A lubricating film is thus formed in the bearing clearance between the shaft and the bearing. The shaft is supported under hydrodynamic shearing stress and dynamic pressure generated by the lubricating film. The hydrodynamic bearing has low abrasion as well as long life and low extent of noise because of no radial contact between the shaft and the bearing under hydrodynamic action.

A related method of manufacturing a hydrodynamic bearing 50 showed in FIG. 1 comprises following processes of: (a1) manufacturing a bearing 52 with a bearing hole 54 therein; and (a2) defining a plurality of hydrodynamic pressure generating grooves 56 in a bearing surface 55 of the bearing 52 by means of chemical etching, electrolysis electric discharge or machining. However, the small size of the hydrodynamic bearing 50 results in difficulty in particular in the making of the grooves 56 in the bearing surface 55 of the bearing 52. This makes manufacturing of the hydrodynamic bearing 50 both time-consuming and expensive. Therefore, the related method is not suitable for mass-production of the hydrodynamic bearing 50.

A hydrodynamic bearing having a plurality of hydrodynamic pressure generating grooves defined in an inner surface thereof has been proposed (see US Patent Pub No. US 2006/0051003 A1). Each of the grooves is wedge-shaped in cross section and extends to sides of the bearing in an axial direction. During rotation of the shaft, the lubricant may leak through the sides of the bearing. As a result, the hydrodynamic action of the bearing is weakened. US No. 2006/0002640 A1 discloses a method for manufacturing a composite hydrodynamic bearing. The composite bearing is formed by combining a plurality of bearing blocks. Because the bearing blocks are manufactured separately, the composite bearing can not obtain an accurate size and concentricity. Furthermore, the lubricant is inclined to leak through interfaces between the bearing blocks. Thus the hydrodynamic action of the bearing is weakened.

It is therefore desirable to provide an improved method for mass production of a hydrodynamic bearing with good hydrodynamic properties.

SUMMARY OF THE INVENTION

A method for manufacturing a hydrodynamic bearing in accordance with a preferred embodiment of the present invention, comprises the steps of: 1. providing a substrate with a plurality of protrusions formed on a periphery thereof; 2. placing the substrate in a hollow mold, then pushing a feedstock of powder and molten binder into the mold to surround the substrate under pressure, thus forming a desired bearing preform; 3. separating the substrate from the bearing preform by means of debinding; 4. sintering the bearing preform; 5. precision machining the bearing preform to form a desired hydrodynamic bearing.

Other advantages and novel features of the present invention will become more apparent from the following detailed description of preferred embodiment when taken in conjunction with the accompanying drawings, in which:

BRIEF DESCRIPTION OF THE DRAWINGS

Many aspects of the present driving device can be better understood with reference to the following drawings. The components in the drawings are not necessarily drawn to scale, the emphasis instead being placed upon clearly illustrating the principles of the present driving device. Moreover, in the drawings, like reference numerals designate corresponding parts throughout the several views.

DETAILED DESCRIPTION OF THE INVENTION

Figure 1:
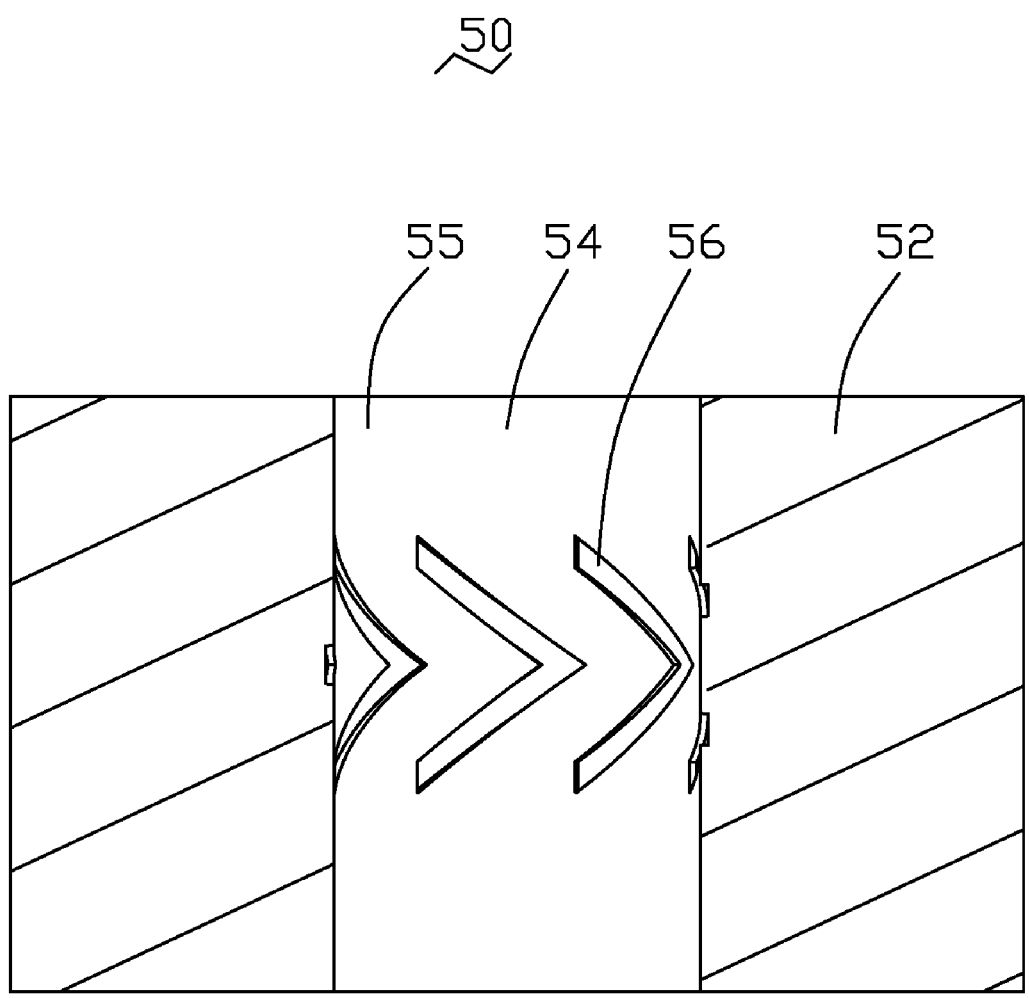
FIG. 1 is a cross-sectional view of a related hydrodynamic bearing.
Figure 2:
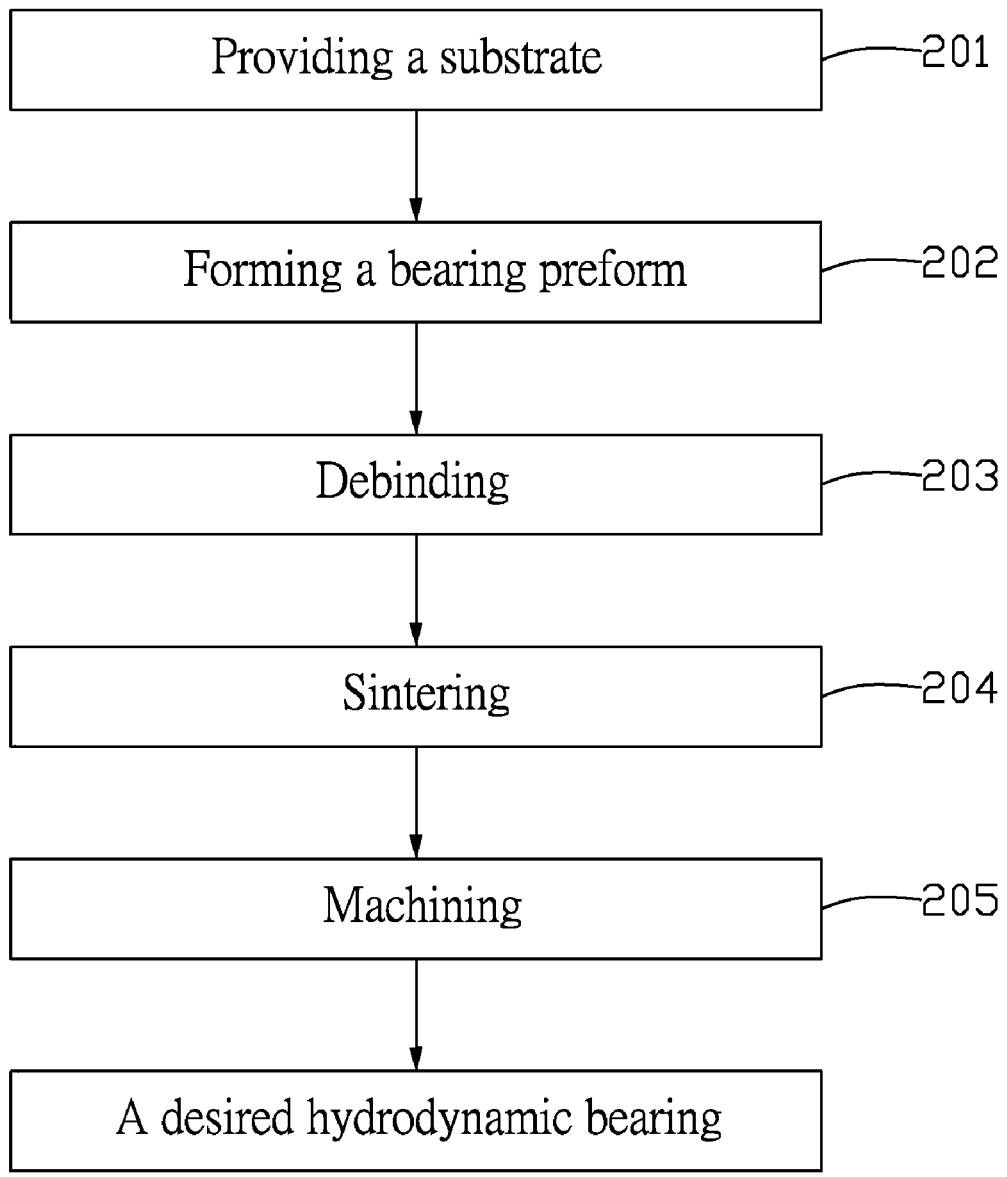
FIG. 2 is a follow chart of a method employed in manufacturing a hydrodynamic bearing in accordance with a preferred embodiment of the present invention.
Figure 3:
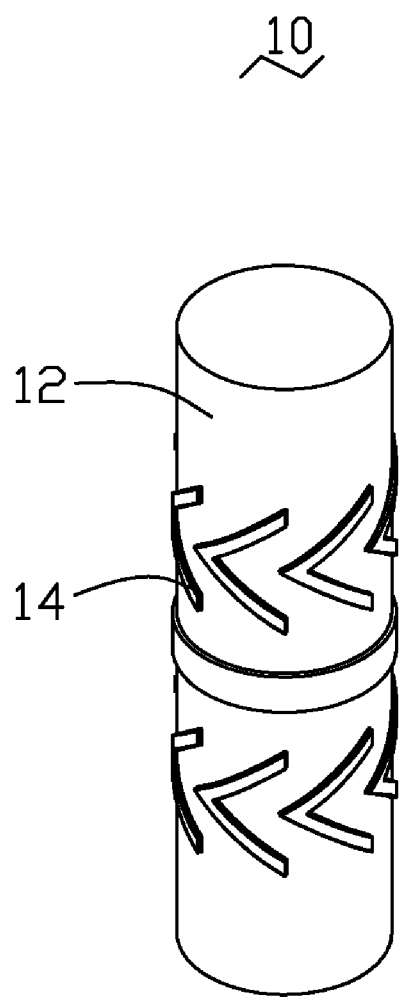
FIG. 3 is an isometric view of a substrate formed by the method of FIG. 2.
Figure 4:
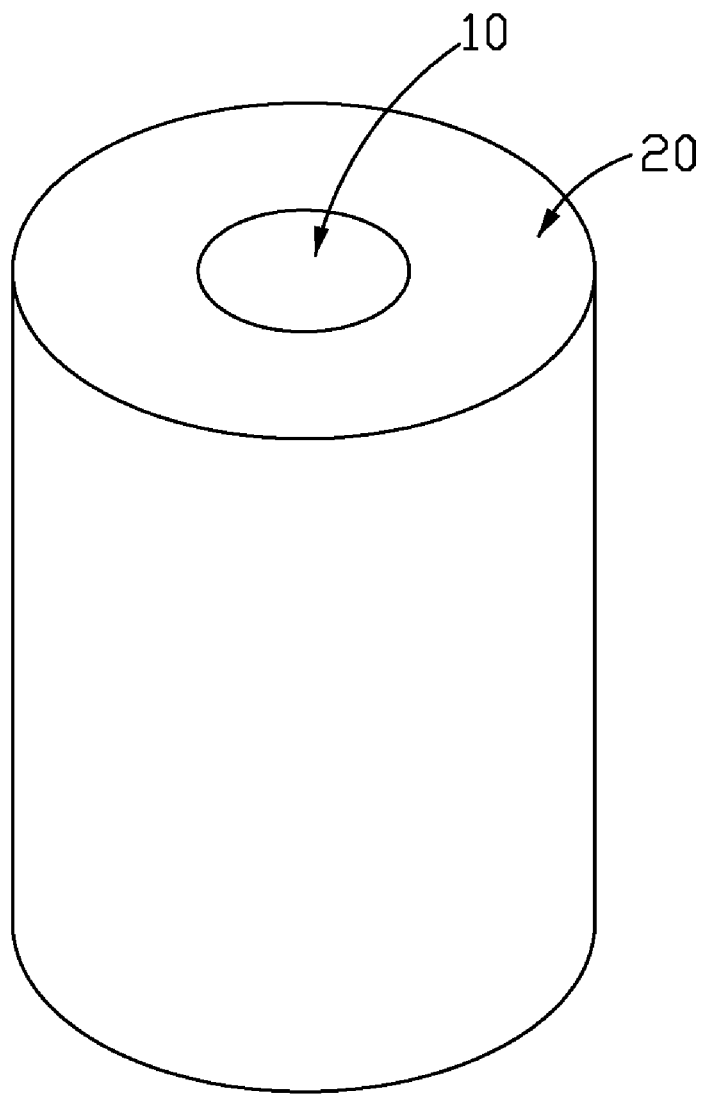
FIG. 4 is an isometric view of the substrate of FIG. 3 surrounded by a bearing preform.
Figure 5:
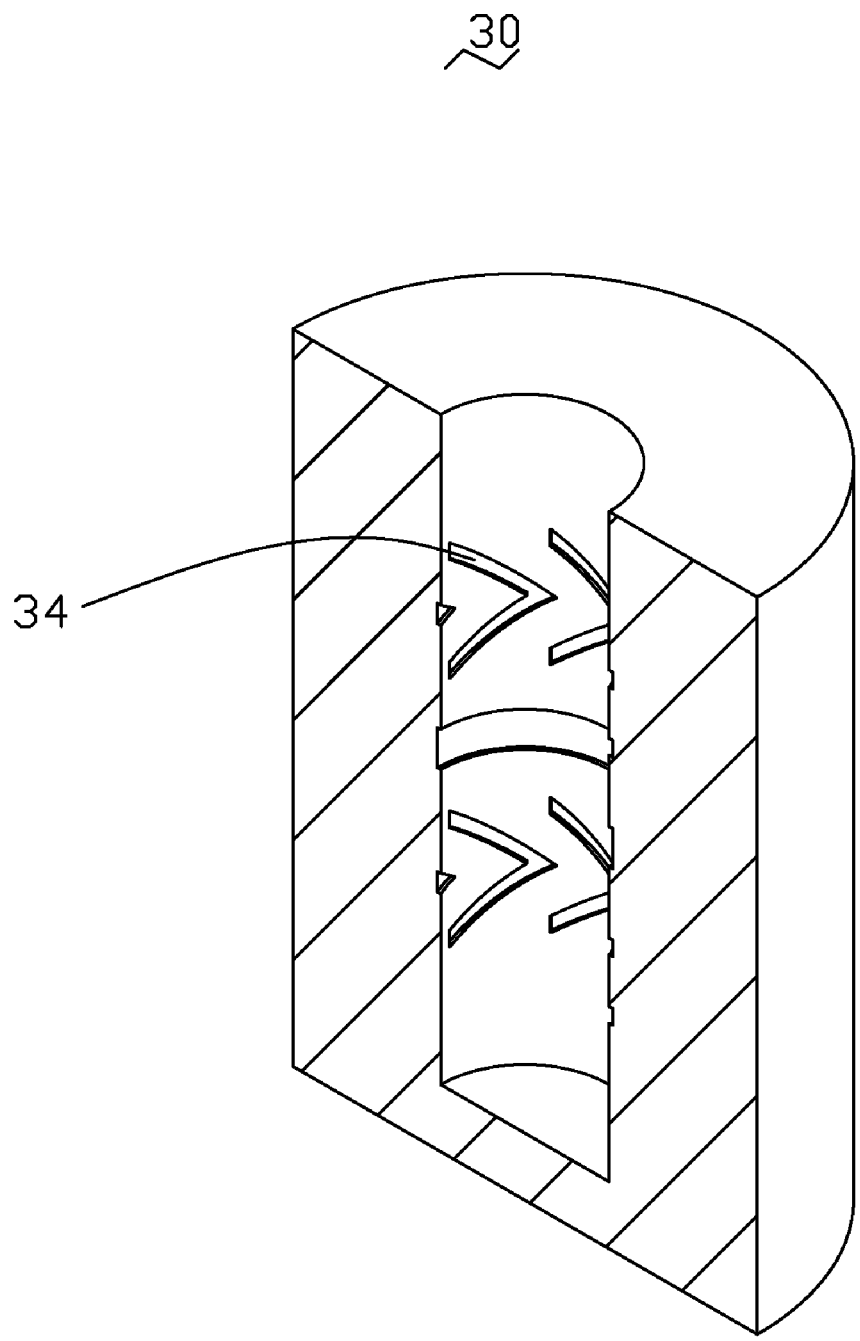
FIG. 5 is a cross-sectional, isometric view of a hydrodynamic bearing obtained by the method of FIG. 2.

Referring to FIG. 5, a hydrodynamic bearing 30 in accordance with a preferred embodiment of the present invention is shown. The hydrodynamic bearing 30 has a plurality of herringbone-shaped grooves 34 with less lubricant leakage that can provide a good hydrodynamic action. The herringbone-shaped grooves 34 can be used as hydrodynamic pressure generating grooves to provide good hydrodynamic action. A method for manufacturing the hydrodynamic bearing 30 in accordance with the present invention, as shown in FIG. 2, comprises the steps of (also referring to FIGS. 3 and 4):

step 201: providing a substrate 10 with a plurality of protrusions 14 formed on a periphery thereof;

step 202: placing the substrate 10 in a middle of a hollow mold, then pushing a feedstock of powder and molten binder into the mold to surround the substrate 10 under a pressure, thus forming a desired bearing preform;

step 203: separating the substrate 10 from the bearing preform 20 by means of debinding;

step 204: sintering the bearing preform 20;

step 205: performing a precision machining to the bearing preform 20, thereby forming the desired hydrodynamic bearing 30.

The step 201 is described in detail as follows: a material for forming the substrate 10 should meet requirements in the step 202 and the step 203. On one hand, in the step 202, a melting point of the material for forming the substrate 10 is required to be higher than that of the molten binder of the feedstock so that the substrate 10 can keep shape when the molten binder is fed to enclose the substrate 10. On the other hand, in the step 203, the material for forming the substrate 10 should be able to be easily separated from the hydrodynamic bearing preform 20 by means of debinding. For example, a material composed of a kind of paraffin having a high melting point can be provided for forming the substrate 10. Meanwhile, the binder used in the step 202 should be a kind of paraffin having a low melting point. The material for forming the substrate 10 further comprises dispersant, surfactant and additive.

External periphery of the substrate 10 corresponds to an inner surface of the desired hydrodynamic bearing 30. The substrate 10 comprises a cylindrical body 12 and a plurality of herringbone-shaped protrusions 14 formed on a circumferential surface of the body 12. The body 12 is used for forming a bearing hole of the hydrodynamic bearing 30 and the protrusions 14 are used to form the herringbone-shaped grooves 34 of the hydrodynamic bearing 30 which can generate hydrodynamic pressure. Each of the protrusions 14 is spaced from each other.

The substrate 10 can be manufactured by means of injection molding, cast molding or machining. Taking the injection molding as an example, it comprises processes of: (c1) melting the material for forming the desired substrate 10; (c2) injecting the molten material into a mold (not shown) to form the substrate 10; (c3) cooling the mold and taking the substrate 10 out of the mold. The injection molding can be performed in a normal injection machine.

The step 202 is described in detail as follows: the hydrodynamic bearing preform 20 is formed by powder extrusion molding (PEM) or metal injection molding (MIM) according to melting points of the materials of the substrate 10 and the binder. For example, the PEM is applied when the substrate 10 is mainly composed of paraffin with a high melting point and the binder is composed of paraffin with a low melting point. The MIM is applied when the substrate 10 is mainly composed of a kind of plastic having a high melting point. The PEM has many same processes with the MIM as follows: (d1) mixing powder and the binder as a feedstock; (d2) pushing the feedstock to form a desired shape such as the hydrodynamic bearing preform 20 in a mold under a pressure. However, the differences between the PEM and the MIM are that the feedstock of the PEM is extruded to form under a pressure less than 300 Mpa, while the feedstock of the MIM is injected into the mold at a high speed. The feedstock generally comprises metal powder or ceramic powder. The injection machine used in the step 201 for forming the substrate 10 can be used to manufacture the hydrodynamic bearing preform 20 in the step 202. The MIM used to manufacture the hydrodynamic bearing preform 20 has many advantages such as high shape complexity, low cost, tight tolerances, high density, high performance etc.

The step 203 is described in detail as follows: the debinding methods available include solvent and thermal cracking debinding. The thermal cracking debinding is applied when the substrate 10 is mainly composed of the paraffin having a high melting point and the binder in the step 202 is composed of the paraffin having a low melting point. The thermal cracking debinding comprises pressure debinding, vacuum debinding and microwave debinding. The solvent debinding is applied when the substrate 10 is mainly composed of a kind of plastic having a high melting point. The solvent debinding comprises following processes: applying the solvent debinding to the hydrodynamic bearing preform 20 formed in the step 202 to remove the binder in the bearing preform 20 partly out, then applying the thermal cracking debinding to the hydrodynamic bearing preform 20 to remove the substrate 10 out of the hydrodynamic bearing preform 20 completely. It is noted that, the hydrodynamic bearing preform 20 is inclined to break during the thermal cracking debinding because of the difference between a coefficient of expansion of the substrate 10 and that of the hydrodynamic bearing preform 20.

The step 204 is described in detail as follows: after the debinding of the step 203, the binder is moved out from the bearing preform 20; thus the bearing preform 20 becomes loosened. Therefore, it is necessary to sinter the bearing preform 20 in place. The sinter process can be performed in a vacuum, or in an oxygen and/or nitrogen atmosphere.

The step 205 is described in detail as follows: generally, the hydrodynamic bearing preform 20 is inclined to shrink during sintering. In order to make a hydrodynamic bearing preform 20 having a high level of precision in its manufacture, it is necessary to perform a machining operation to the bearing preform 20 using methods such as broaching, grinding, milling, polishing, and so on.

Compared with the related method for manufacturing the hydrodynamic bearing 50, the hydrodynamic bearing 30 is adapted for mass-production by the method in accordance with the preferred embodiment of the present invention. Also, the hydrodynamic bearing 30 manufactured by the present method can provide good hydrodynamic characteristics and reduced leakage. Furthermore, the method in accordance with the preferred embodiment of the present invention can be used for manufacturing other kinds of hydrodynamic bearings or shaft with different shapes of grooves. When applying the method to make a desired shaft with hydrodynamic pressure generating grooves formed in a circumferential surface thereof, a substrate with a central hole defined therein should be provided. An internal surface of the substrate is required to correspond to the circumferential surface of the desired shaft.

It is to be understood that the above-described methods are intended to illustrate rather than limit the invention. Variations may be made to the methods without departing from the spirit of the invention. Accordingly, it is appropriate that the appended claims be construed broadly and in a manner consistent with the scope of the invention.

What is claimed is:

1. A method of manufacturing one of shaft and bearing comprising:

forming a substrate having a surface with a plurality of protrusions thereon, the protrusions being adapted for forming grooves in the one of the shaft and bearing for generating hydrodynamic pressure;

pushing a feedstock of binder and powder to the surface to form a perform on the surface of the substrate;

removing the substrate from the perform;

sintering the preform;

precision machining the preform to obtain the one of the shaft and bearing; the step of pushing a feedstock includes metal injection molding (MIM), the metal injection molding comprises placing the substrate into a mold and then injecting the feedstock of binder and powder into the mold to form the preform;

wherein the substrate includes a kind of plastic with a melting point higher than that of the binder of the feedstock; and wherein the step of removing the substrate comprises: applying solvent debinding to the preform formed in the step of pushing a feedstock to remove the binder in the preform partly out, and then applying thermal cracking debinding to the preform to remove the binder in the preform completely, thereby removing the substrate from the perform.

2. The method as claimed in claim 1, wherein the powder includes one of metal powder and ceramic powder, and the binder includes paraffin.

3. The method as claimed in claim 1, wherein the substrate is a hollow cylindrical body, and the protrusions are formed on a circumferential surface of the body.

4. The method as claimed in claim 3, wherein the protrusions are herringbone-shaped.

5. The method as claimed in claim 4, wherein the method is used to form the bearing, the protrusions are formed on an outer circumferential surface of the body, and the feedstock of powder and binder are injected into the mold to surround the substrate to form a bearing preform around the substrate.

6. The method as claimed in claim 4, wherein the method is used to form the shaft, the protrusions are formed on an inner circumferential surface of the body, and the feedstock of powder and binder are injected into the substrate to form a shaft preform in the substrate.

7. The method as claimed in claim 1, wherein the thermal cracking debinding is one of pressure debinding, vacuum debinding and microwave debinding.

8. The method as claimed in claim 1, wherein the step of pushing a feedstock is power extrusion molding comprises extruding the feedstock under a pressure less than 300 MPa to form the perform.

9. The method as claimed in claim 8, wherein the substrate is mainly composed of paraffin having a high melting point, and a molten binder of the feedstock is mainly composed of the paraffin having a low melting point.

10. The method as claimed in claim 9, wherein the step of removing the substrate is applying thermal cracking debinding to the preform to remove the binder in the preform completely, thereby removing the substrate from the preform.

11. The method as claimed in claim 10, wherein the thermal cracking debinding is one of pressure debinding, vacuum debinding and microwave debinding.

12. The method as claimed in claim 1, wherein the substrate is manufactured by means of one of injection molding, cast molding and machining.

\* \* \* \* \*